United States Patent [19]

Clark

[11] Patent Number: 4,897,814
[45] Date of Patent: Jan. 30, 1990

[54] PIPELINED "BEST MATCH" CONTENT ADDRESSABLE MEMORY

[75] Inventor: Lawrence T. Clark, Scottsdale, Ariz.

[73] Assignee: Arizona Board of Regents, Tempe, Ariz.

[21] Appl. No.: 202,376

[22] Filed: Jun. 6, 1988

[51] Int. Cl.$^4$ .................. G11C 7/00; G11C 15/00; G11C 11/40

[52] U.S. Cl. .................. 365/49; 365/189.07; 365/230.01

[58] Field of Search .................. 365/49, 230, 230.01, 365/230.08, 230.06, 189.07

[56] References Cited

U.S. PATENT DOCUMENTS 4,084,260  4/1978  Fleming et al. .................. 365/49 X
4,438,489  3/1984  Heinrich et al. .................. 365/49 X Primary Examiner—Stuart N. Hecker
Assistant Examiner—Alysse H. Bowler
Attorney, Agent, or Firm—Richard R. Mybeck

[57] ABSTRACT

A memory system for rapidly choosing a stored item which most closely matches a given input is having a unique memory architecture capable of returning the item stored which most closely correlates to the input. The architecture represents a departure from previous digital content-addressable memories (CAM's) in that it is capable of returning the stored data which most closely resembles the input data rapidly. In addition, a measure of the quality of the selected (best matching) memory is generated. The architecture is capable of significant data throughput rates due to pipelining, and is amenable to implementation using conventional digital VLSI fabrication processes.

13 Claims, 2 Drawing Sheets

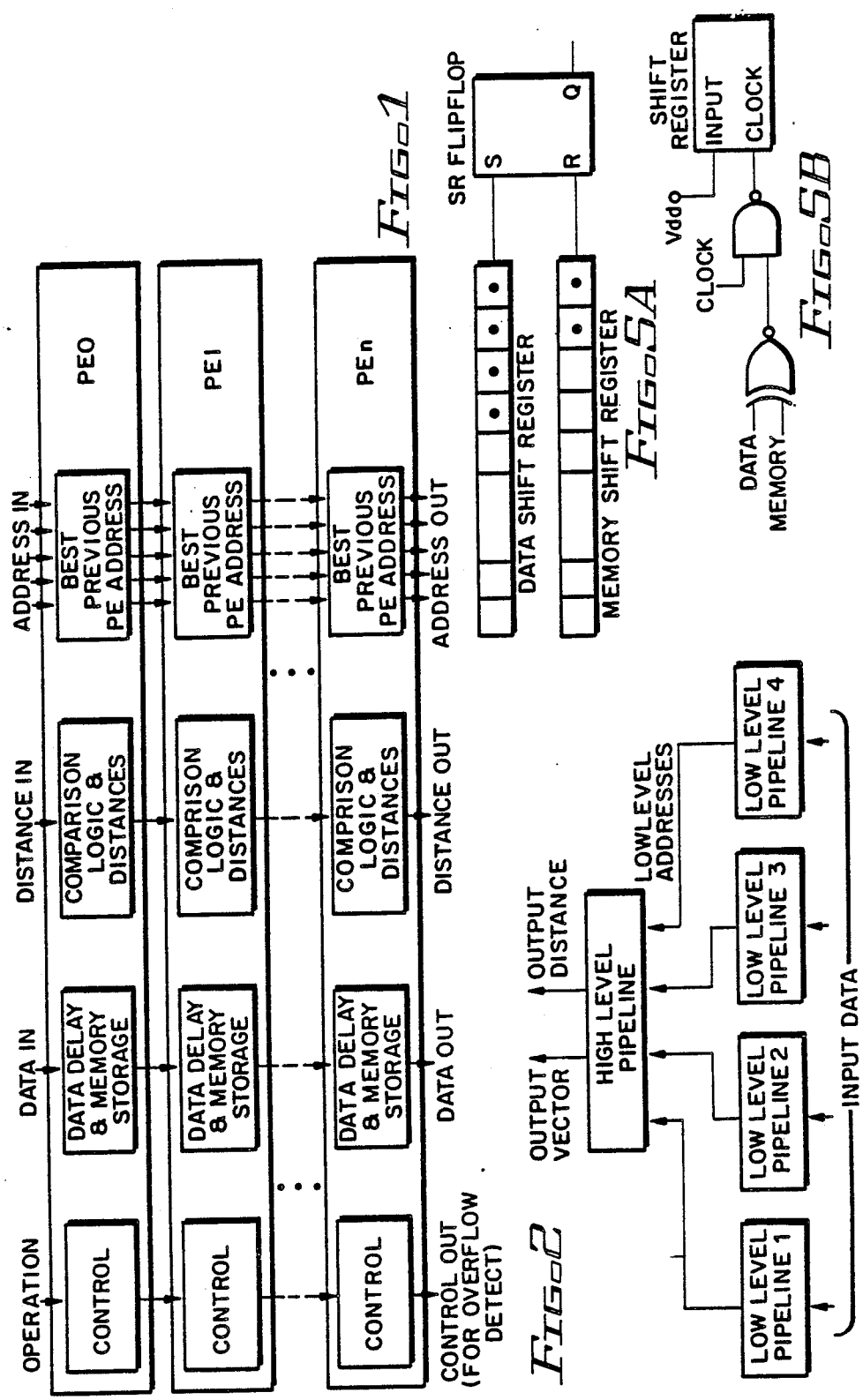

PIPELINED "BEST MATCH" CONTENT ADDRESSABLE MEMORY

INTRODUCTION

The present invention relates to a computer memory system which rapidly chooses the stored item which most closely correlates the input with an architecture which represents a major departure from previous digital content-addressable memories (CAMS).

BACKGROUND OF THE INVENTION

The current state of the art in content addressable memory (CAM) systems has taken two divergent directions as a result of the existence of two rather different application environments. In the first, CAM are used as high speed lookup tables in the cache memory systems of large computers. This requires a high speed (essentially parallel) examination of the contents and an output indicating a perfect match (a hit), or that no perfect match exists (a miss). Semiconductor chips which perform these functions have been widely available for some time. The second, less common, applicational environment arises in the fields of communication, artificial intelligence and cognitive science. Here content addressable memories are used as a primitive model of the brain, which during recognition is believed to function in a content-addressable manner. In this application, the system is asked to produce the memory which most closely correlates to the input, i.e. recognition. A large number of mathematical models for such functions exist, mostly distributed processing in nature, of which neural models are presently the most popular. A number of artificial neural network (ANN) systems have been reported, mainly comprising VLSI chips.

A conventional CAM finds typical application in the cache and virtual memory systems of computers. In operation, the input word is compared (don't care columns are masked) with the stored array of words in parallel. The output is typically the address of the matching memory word. These memories generally function as a standard RAM when being written, that is, memory words are addressed.

These memories have been implemented with high density in an integrated circuit due to the fact that (for a metal oxide semiconductor process) only nine transistors are required per bit. Additional circuitry is required for address decoding and the resolution of contention. While the masking register provides some measure of flexibility in searching the contents and is capable of allowing the memory to function in a best match manner by setting bits in the masking register to allow a stored word which only partially matches the input to be found.

To find the stored data which most closely matches the input in Hamming distance, using the prior art systems, the input must be matched against the memory array with no mask bits set and if a match is found, it is a perfect one; a single bit must be matched across the mask register, matching at each location; and a match must be conducted for every combination of two, then three and so on, until a match if found.

Obviously, when a large word size is involved, this tedious procedure represents a potentially very time consuming methodology. Thus in the worst case, this highly inefficient scheme would take $2^W$, where W is the word length in bits. Note that not only is the average search time quite high, the actual search time would be wildly unpredictable.

Highly connected neural networks have been proposed to implement content-addressable memories (CAMS) which network function in an associative or auto-associative mode. However, such network systems are not merely memories, they are distributed computing machines which are capable of finding the memory vector which most closely correlates to the input vector. While such networks have been constructed in monolithic IC form, the large number of preferably modifiable interconnections and the high connectivity required present formidable obstacles to be overcome. High memory density has been achieved, but at the cost of real-time write capability, or through the use of non standard fabrication techniques. The use of standard VLSI fabrication techniques has generally resulted in low memory densities.

The ability to locate the candidate which most closely matches the input appears important in a number of "human" recognition tasks, and key to the impressive results which the neural networks (both fully connected and layered) have provided.

A memory device which performs such "best match" memory access in a rapid, efficient and reliable manner is thus a major desideratum of artificial intelligence systems and a problem for which a solution is needed.

BRIEF SUMMARY OF THE INVENTION

The present invention relates a memory device which performs "best match" memory access in a rapidly efficient and reliable manner. More particularly, the present invention relates to a computer memory system which rapidly chooses the stored item most closely correlated to the input using a novel and unique architecture which is fully digital and is amenable to implementation using a conventional VLSI process. The device is specifically organized as a pipeline of identical processing elements, each of which is of a size and complexity so that a large number may be included on a single integrated circuit. Pipelining is utilized for computational efficiency resulting in a high throughput rate. The input to the memory pipeline is the data vector to be matched while the output of the pipeline is the address of the best matching memory location and a metric which quantifies the quality of the selection.

Accordingly, a primary object of the present invention is to provide a new and unique content addressable memory system which fills the void left by the current state of the art.

These and still further objects as shall hereinafter appear are fulfilled by the present invention in a totally unexpected manner as can be readily discerned from a careful consideration of the following detailed description of preferred embodiments thereof, especially when read in conjunction with the accompanying drawings.

DESCRIPTION OF THE DRAWINGS

In the drawings

FIG. 1 is a block diagram for an overall memory system embodying the present invention;

FIG. 2 is a block diagram of a hierarchical machine embodying the present invention:

FIG. 5 shows an alternate embodiment of the present invention using a shift register and a flip-flop.

DESCRIPTION OF PREFERRED EMBODIMENTS

Figure 3:
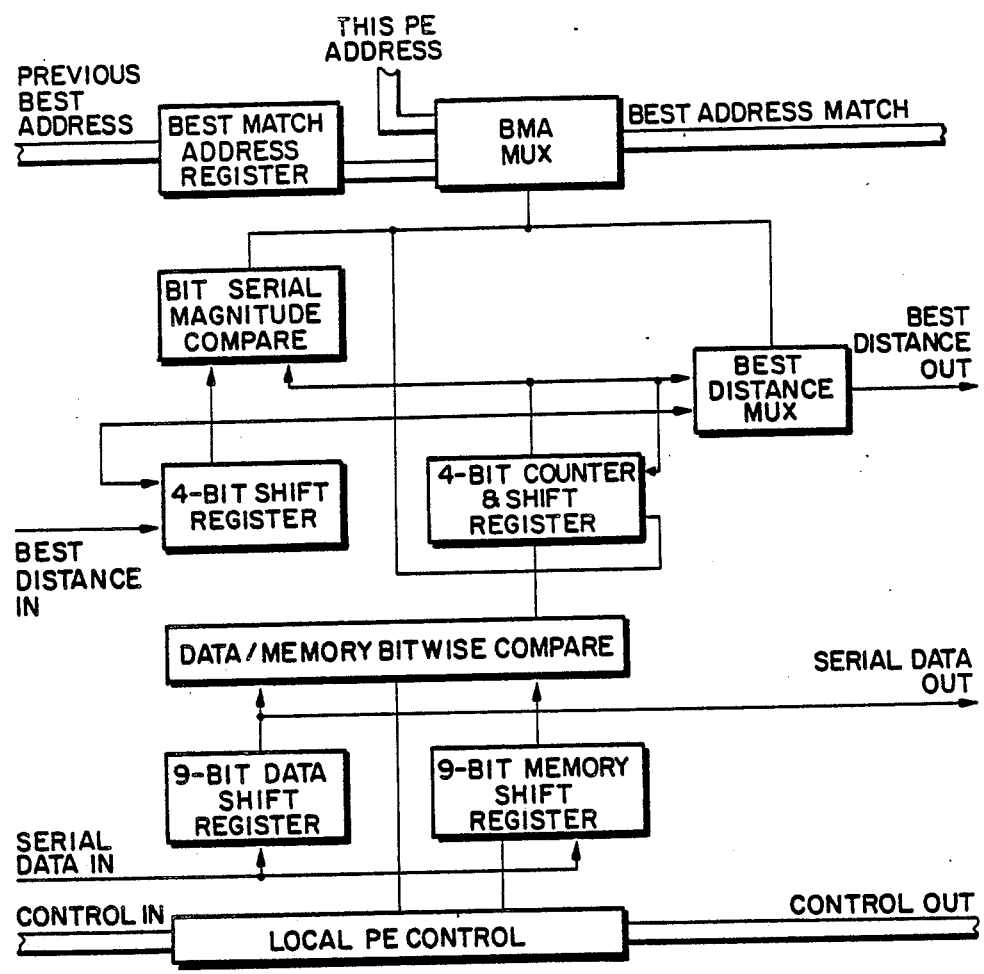
FIG. 3 is a block diagram of a single PE in accordance with the present invention.

The present invention relates to computer memory systems and more particularly to a memory system which rapidly chooses the stored item most closely correlated to the input using a novel and unique architecture.

The aforesaid architecture is fully digital and is amenable to implementation using a conventional VLSI process. As will appear, it is organized as a pipeline of identical processing elements (PE's). The PE's are of a size and complexity such that a large number may be included on a single IC. Pipelining is utilized for computational efficiency, resulting in a high throughput rate. The input to the memory pipeline is the data vector to be matched, while the output of the pipeline is the address of the best matching memory location and a metric which quantifies the quality of the selection.

As each PE needs only connect to its two nearest neighbors, the amount of area on the chip dedicated to interconnections is minimal. A block diagram of the overall memory system is shown in FIG. 1. As will appear, such an architecture may handle data in parallel or serial fashion. Each PE contains a word of memory, the necessary logic for the PE to compare the present input to its memory, measure the distance between these two, compare the distance to that found by the PE above it, and gate the best matching address onwards. In this manner, data flows downwards through the pipeline, as does the address of the best matching PE memory location. The logic required by each PE is thus minimal, making such an approach feasible for a large number of processing elements. The output of each pipe is the input data, the best matching address, and a measure of the quality of the output. Having a measure of the output quality is of potential use in a large system environment.

Data-element serial processing represents an economical use of chip area. In addition, the simplicity of the resulting data paths allows for minimal logic delays, enhancing performance. Thus serial processing was chosen for the prototype device. Each PE is capable of storing one vector, and of comparing this vector to the input data. A distance metric is generated in each compare operation. This distance is in turn compared to the previous one, determining the best matching location. Each PE outputs to the next the input vector, the best matching location address, and the corresponding distance metric thus far. For a system of N PE's, N comparisons are made simultaneously. The inputs to the pipeline are a command (match or write), and the vector to be matched to or written. Match and write operations may be interspersed. Writing is a non-addressed operation, with the first unused location being writing, and the location being returned as the output of the operation. The ability to write a specific location is relatively unimportant, as it is a simple matter to map the output-addresses to arbitrary vectors using a RAM or PLA.

Capacity may be increased beyond that available on each IC chip by the use of multiple devices in a number of ways. First, the IC's may be cascaded, allowing a longer pipeline to be produced by using a number of the chips, increasing the number of memory words available. Secondly, the memory IC's may be combined in parallel, thereby increasing the effective length of each vector. The simplest method of achieving this is to concatenate the output vectors. A more efficient approach is to use another pipeline which takes addresses as input vector elements, to combine and correlate the pipeline outputs. The resulting hierarchical machine is schematically illustrated in FIG. 2. In both cases the throughput of the system (as measured in bits/sec.) is improved proportionally to the number of parallel pipe lines. In the later case, the need to store redundant values in the pipes is eliminated. Such hierarchical systems also allow multiple levels of abstraction to be included in the recognition process. Note that the vectors input to the higher level pipeline are comprised of addresses output from the lower level pipes, with each address constituting a vector element. This is necessary since addresses near each other in Hamming distance may not have any correspondence. By careful placement of data, and the use of thermometer codes or similar schemes, this requirement may be relaxed.

VLSI allows a pipeline (or a group of pipelines) to be implemented monolithically. This allows the processing elements to be physically close, which increases the potential performance of the system by limiting the parasitic delays inherent to electrical computing systems. Thus the performance of the architecture, as measured by its throughput, is high. Pipelining provides the bulk of this, but the simplicity of the operations which the PE's must perform allows them to be very small and fast. Since each PE can compare one input word against its memory word, there are N input words (vectors) being compared simultaneously in a pipeline of length N. Thus a result can be generated once every PE cycle time. From application of input, to the best match result requires N (PE cycle times).

An important feature of the present invention arises from the efficient programming or training of the memory, i.e., the procedure of how data is added to the pipeline. The present teaching utilizes the discrimination of inputs that are sufficiently far apart and the correlation of inputs that are sufficiently similar. Where a memory is stored and precisely what output will be generated upon a match to it is secondary so long as the output is chosen by the learning system such as a special purpose CAM. The control or host can accommodate whatever output is chosen. Thus writing to a CAM pipeline is a non-addressed operation. Each location has an associated "used" bit. The operation chosen hereby is represented by a single bit field which propagates downwards through the pipeline, indicating write or match. If the operation is write, the first empty location is written. This results in a perfect match, and the location written is output. After a write, the operation bit is changed to a match to prevent more than one location from being written. If the output must match some value chosen in advance, the values can be written in order, such that the address of each memory matches the desired output value. If the output value must be some arbitrary value, a PLA, RAM or other such device can be used to map the outputs to the required values.

The scheme for detecting memory overflow shall now be described. Two bits, namely, the operation (OP) bit and the write (WRT) bit, propogate down the pipeline in step with the input vector. Both bits match initially, e.g., both a logic "one" for a write operation, both a logic "zero" for a match operation. Upon writing a blank location, the WRT bit is toggled, the OP is not.

Thus if both bits are a "one" at the end of the pipeline, the pipeline memory is full, i.e., the operation was not performed.

With the problem of memory-vector locations thus resolved, let us consider the writing of memories. Key to the writing of memories is the avoidance of redundancy among the memory words and scarce memory locations (PE's) should not be squandered on data which is already stored. During a learning phase, it is possible that some data will be written to the pipeline, which will be followed soon afterwards by the same data. In the CAM pipeline of the present inventor, two locations will be written with the same data. An effective method to avoid such a redundant situation is to have a match operation carried out on data that is to be written. If a perfect match occurs, the write operation is modified into a match operation. A varying match threshold can also be accommodated. The logic required to implement this capability is a magnitude comparator. Fortunately, each PE already contains a magnitude comparator so the hardware expense is minimal. Thus, by simply comparing the quality of the match found, a decision may be made as to whether the data is new, or merely a corrupted version of something known, locally (within the PE).

A number of the features embodied in the present invention, will now be discussed in further detail.

The generality of the architecture is enhanced by its flexibility. Just as conventional computer systems come in a multitude of configurations, each specialized for given applications, the CAM pipeline of the present invention can be altered to suit a particular task. For systems where exceptional throughput is not necessary, each PE may have more than one memory location sharing the same distance computation and match control circuitry. Only additional address logic would be necessary. In a variation multiple memory shift registers will allow rapid "context switching", that is, for different expected environments, different register banks will be active.

The architecture is flexible as the word size and capacity may be varied arbitrarily and are not functions of one another. In addition, the capacity is unrelated to the data stored, as it is always limited to (or based on) the number of PE's included in the given implementation. Thus it is a simple matter to predict and detect memory saturation. This is not the case for the fully connected neural net memories, where the practical capacity is a function of the vector width, and has been shown empirically to increase linearly with increasing n, where n is the number of "neurons" (See: Hopfield, *Proc. Nat. Acad. Sci. USA*, 79: 2554 (1982)). In addition, the number of connection units increases with the square of n. The usable capacity is also a function of the actual data to be stored. These characteristics constitute one of the primary advantages the pipelined CAM approach of the present invention has over its neural net based counterparts.

The input vector size should match the application input stream well for efficient operation. For a bit serial match machine, the memory circuitry grows linearly in size with increasing word size (W), while the distance and match control registers grow proportional to $\log_2 W$. Performance, as measured by throughput, is unaffected by increasing word size. The time from an input to an output increases linearly with increasing word size. It is possible to utilize multiple pipelines in parallel, as described above. This effectively increases the input vector width with a very positive effect on performance as measured by throughput (bits/second).

The distance measure may also be chosen to reflect the intended application. Thus the availability of the distance metric may be of great benefit to the host system, as it is afforded knowledge about the quality of the outcome of the matching process. This is analogous to a person knowing whether or not they possess knowledge regarding a certain subject, regardless of the present retrievability of that knowledge. The neural network systems can offer no comparable output. Behavioral simulations have shown the distance metric to correlate very well with the correctness of the results.

A number of distance metrics exist. All such metrics are measures of similarity or dissimilarity, as the key to effective associative memory systems is selectivity. Closely related data should be related by the system, while the system must effectively discriminate between distant or unrelated inputs.

From the foregoing it is apparent that the architecture hereof possesses a number of advantages over conventional content-addressable memories, e.g., cache memory subsystems, when these conventional memories are utilized in a best match fashion, and over the ANN approach.

In one practice of the present invention, a prototype device was created in CMOS using the MOSIS 3 $\mu$m design rules. The device contains 16 PE's, each with a word size of 9 bits. An address space of 6 bits is provided along with logic to allow cascading of four such sub-pipelines to produce a single larger pipeline up to 64 locations in depth. Each PE performs its operations bit-serially, greatly simplifying the required logic and interconnection sizes. A high clock rate combined with the substantial parallelism inherent to the architecture produced high machine throughput.

The data path logic of the device has been tested and shown to function correctly at speeds of 35 MHz. This corresponds to a throughput rate of approximately 18.5 million bits of data per second. The actual time from input to output is a linear function of the pipeline length, with a PE cycle time of 17 clocks, nine of which are devoted to moving the data. Four cycles are required for the distance comparison, and four more are required for serial movement of the distances. The addresses are moved in parallel, simultaneously with the distances.

The bit-serial approach for the design of each PE is particularly suitable for a bit by bit comparison of the input data and the memory to compute the Hamming distance. Note that this becomes a data element serial approach for vectors of non-bit elements. The prototype device is designed to handle bit vectors. The block diagram of a single processing element is shown in FIG. 3.

Each PE comprises the following major functional blocks: a local control; a data shift register; a memory shift register; best distance shift register; a present distance counter/shift register; a bit serial magnitude comparator; and a best match address register.

The distance measure chosen for the prototype device is the Hamming distance. The Hamming distance is probably the best known and most commonly used measure of the dissimilarity between two items. It is applicable to the comparison of vectors (ordered sets) of any items. The Hamming distance is a count of the number of different symbols in the two vectors being compared and is defined for sequences of equal length only. For binary patterns, this metric is expressed as:

$$p_H(x, y) = \sum_{i=1}^{W} x_i \text{ exor } y_i$$

where $x_i$ is the ith element of vector x, and $y_i$ is the ith element of vector y.

The data and memory are compared by generating the exclusive-or of both the data and memory shift register outputs. This result is then gated by the clock to produce a counting signal for the combination shift register/counter. This unit counts up when the data bits match. The count, and the distance values compared, represent $$W - p_H(x,y)$$

where W is the word width and $p_H(x,y)$ is the Hamming distance between the data and memory vectors. The larger value on the counter represents a better match.

The four-bit combination shift register/counter represents the single most complicated block in the processing element of the device hereof. The bit serial magnitude comparator is used to determine which of the present or previous best match distance values is greater, noting that the larger number represents the better match. The circuit functions to control which address and which distance will be gated onwards. If the contents of the memory in the present PE location has a smaller or equal Hamming distance, it is sent to the next PE in the pipeline. Otherwise, the previous address and distance are gated onwards so that the last location matching will win a tie.

Each PE requires a small block to provide local control. Two operation bits are used, implementing the scheme previously described returning the status of the operation performed, that is, signalling a memory overflow. The used bit gates the compare operation. If a location is not programmed, it will not be compared to the input data. Thus uninitialized locations will not affect processing. This bit is toggled after a write operation takes place. The used bit also gates the write operation as described previously.

Behavioral simulations of a variety of system configurations have been performed and demonstrate the applicability of the pipelined CAM architecture to the solution of a variety of cognitive tasks. Some of these simulations utilize bit vector pipelines as described above, while others utilize PE's with multiple byte word size. The former is useful in an image recognition environment, while the latter is useful for language processing, with each character occupying a byte (as in ASCII codes).

Figure 4:
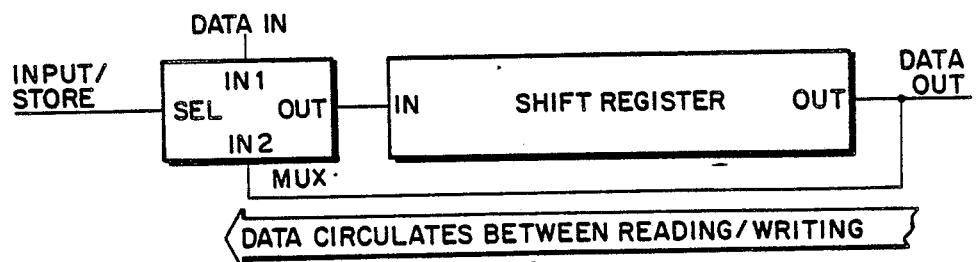
FIG. 4 illustrates the recirculation of data around dynamic shift register.

In an alternative embodiment of the present invention, a machine is constructed incorporating dynamic logic and utilizing a more compact fabrication process to achieve a substantially higher capacity and throughput rate. Memory density is improved using CCD's to implement the shift registers which comprise the memory elements. Dynamic memory using a recirculate function, as shown in FIG. 4, removes the need to constantly refresh data. The need for counters is also eliminated by using the population count scheme shown in FIG. 5. In this case a $\log_2 W$ bit counter is replaced by a W bit shift register, where W is the maximum value required to count, the data vector length in the pipelined CAM. This further increases the memory density, as counters, particularly if they need be static, use a large amount of chip area.

From the foregoing, it becomes apparent that new and useful means and methods have been herein described and illustrated which fulfill all of the aforestated objectives in a remarkably unexpected fashion. It is of course understood that such modifications, alterations and adaptations as may readily occur to an artisan having the ordinary skills to which this invention pertains are intended within the spirit of the present invention which is limited only by the scope of the claims appended hereto.

Accordingly what is claimed is:

1. A pipelined content addressable memory for rapidly locating the best match therein and generating an address pattern therefrom comprising: a pipeline containing a plurality of identical processing elements, each processing element containing a delay section containing data, a storage section containing data, first means to generate a distance metric between said data in said delay section and said data in said storage section, and second means to compare the magnitude of said distance metric of one processing element with the distance metric generated by the immediately preceding one of said processing elements in said pipeline and when the distance metric of said one processing element is less than that of said immediately preceding processing element placing the address of said one processing element on the address pattern output of said processing element and when the distance metric of said one processing element is greater than or equal to that of said immediately preceding processing element, and placing said address of said immediately preceding processing element on said output; a control circuit generating clock signals which synchronize communication between each of said processing elements and said preceding processing element corresponding thereto; and means for collecting and recording the address pattern created thereby, each such processing element having a data delay memory storage unit, a local control unit having operation storage and used storage means for generating a distance metric between the data contained within said data delay and said memory storage units, means to compare the magnitude of said distance metric generated in said processing element with the smallest distance metric corresponding to the data which is contained in the processing element disposed prior thereto in said pipeline, a least previous distance metric storage unit, a best matching location (that address with the least distance metric) storage unit, and a control circuit having a single bit storage element therein for indicating the validity of the data stored within said processing element, said single bit storage element controlling the writing of new data to the storage of the processing element while avoiding overriding valid data already contained in said storage.

2. A pipelined content addressable memory according to claim 1 in which said distance metric is the Hamming distance.

3. A pipelined content addressable memory according to claim 2 in which said means to compare magnitudes of distance metrics is a bit serial magnitude comparator.

4. A pipelined content addressable memory according to claim 2 in which said least previous distance metric storage unit is a static shift register.

5. A pipelined content addressable memory according to claim 2 in which said least previous matching location storage unit is a static parallel register.

6. A pipelined content addressable memory according to claim 1 in which said means to compare magnitudes of distance metrics is a bit serial magnitude comparator.

7. A pipelined content addressable memory according to claim 1 in which said least previous distance metric storage unit is a static shift register.

8. A pipelined content addressable memory according to claim 6 in which said least previous matching location storage unit is a static parallel register.

9. A pipelined content addressable memory according to claim 1 in which said least previous distance metric storage unit is a static shift register.

10. A pipelined content addressable memory according to claim 9 in which said least previous matching location storage unit is a static parallel register.

11. A pipelined content addressable memory according to claim 1 in which said least previous matching location storage unit is a static parallel register.

12. A pipelined content addressable memory according to claim 1 in which said single bit storage element controls the matching of input data to the data stored in said element without matching input data to invalid data stored therein.

13. A pipelined content addressable memory for rapidly locating the best match therein and generating an address pattern therefrom comprising: a pipeline containing a plurality of identical processing element, each processing element containing a delay section containing data, a storage section containing data, first means to generate a distance metric between said data in said delay section and said data in said storage section, and second means to compare the magnitude of said distance metric of one processing element with the distance metric generated by the immediately preceding one of said processing elements in said pipeline and when the distance metric of said one processing element is less than that of said immediately preceding processing element, placing the address of said one processing element on the address pattern output of said processing element and when the distance metric of said one processing element is greater than or equal to that of said immediately preceding processing element, and placing said address of said immediately preceding processing element on said output; a control circuit generating clock signals which synchronize communication between each of said processing elements and said preceding processing element corresponding thereto; and means for collecting and recording the address pattern created thereby, each such processing element having a data delay memory storage unit a local control unit having operation storage and used storage means for generating a distance metric between the data contained within said data delay and said memory storage units, means to compare the magnitude of said distance metric generated in said processing element with the smallest distance metric corresponding to the data which is contained in the processing element disposed prior thereto in said pipeline, a least previous distance metric storage unit, a best matching location (that address with the least distance metric) storage unit, and a control circuit having a single bit storage element therein for indicating the validity of the data stored within said processing element said single bit storage element controlling the matching of input data to the data stored in said element without matching input data to invalid data stored therein.

* * * * *